US012591658B2

(12) United States Patent
Chen

(10) Patent No.: US 12,591,658 B2
(45) Date of Patent: Mar. 31, 2026

(54) INTER-ENTITY VIRTUAL CREDENTIAL GENERATION

(71) Applicant: Capital One Services, LLC, McLean, VA (US)

(72) Inventor: Xian Chen, Denver, CO (US)

(73) Assignee: Capital One Services, LLC, McLean, VA (US)

( * ) Notice: Subject to any disclaimer, the term of this patent is extended or adjusted under 35 U.S.C. 154(b) by 219 days.

(21) Appl. No.: 18/508,650

(22) Filed: Nov. 14, 2023

(65) Prior Publication Data

US 2025/0156525 A1     May 15, 2025

(51) Int. Cl.
*G06F 21/45* (2013.01)

(52) U.S. Cl.
CPC .................................... *G06F 21/45* (2013.01)

(58) Field of Classification Search
CPC .. G06Q 20/204; G06Q 20/351; G06Q 20/355; G06Q 20/3552; G06Q 20/36
See application file for complete search history.

(56) References Cited

U.S. PATENT DOCUMENTS

2019/0378102 A1* 12/2019 Kohli ................. G06Q 20/4014
2020/0005317 A1* 1/2020 Amor ................. G06Q 20/4018
2023/0245125 A1* 8/2023 Mossoba ........... G06Q 20/4014

OTHER PUBLICATIONS

"How to make purchases with Apple Card." 3 pgs, downloaded Sep. 22, 2023, Retrieved at https://support.apple.com/en-us/HT209225.
"Use virtual card Nos. to pay online or in apps." 3 pgs, downloaded Sep. 22, 2023, https://support.google.com/googlepay/answer/11234179?hl=en&co=GENIE.Platform%3DAndroid.

* cited by examiner

*Primary Examiner* — Daniel B Potratz
(74) *Attorney, Agent, or Firm* — Harrity & Harrity, LLP

(57)     ABSTRACT

In some implementations, a device, may transmit, to an interface system, a request for credential information associated with a user. The device may receive, responsive to the request, the credential information associated with the user, where the credential information indicates a primary credential associated with a physical card. The device may generate a virtual credential for the physical card, where the virtual credential is mapped to the primary credential associated with the physical card. The device may cause activation of the virtual credential in a credential manager associated with the user.

20 Claims, 10 Drawing Sheets

100

102 Request to generate
a virtual number

Credential
Management
Application

Management
System http://buythingsontheweb.com/checkout

SHIPPING ADDRESS > DELIVERY OPTIONS > BILLING

Would you like a new virtual
number?

CONTINUE

Account Number

Expiration Date     Security Code

PLACE ORDER

User Device

100

126 Generate an additional
virtual credential

Management
System

124 Indication of an additional user
authorized to use the primary credential

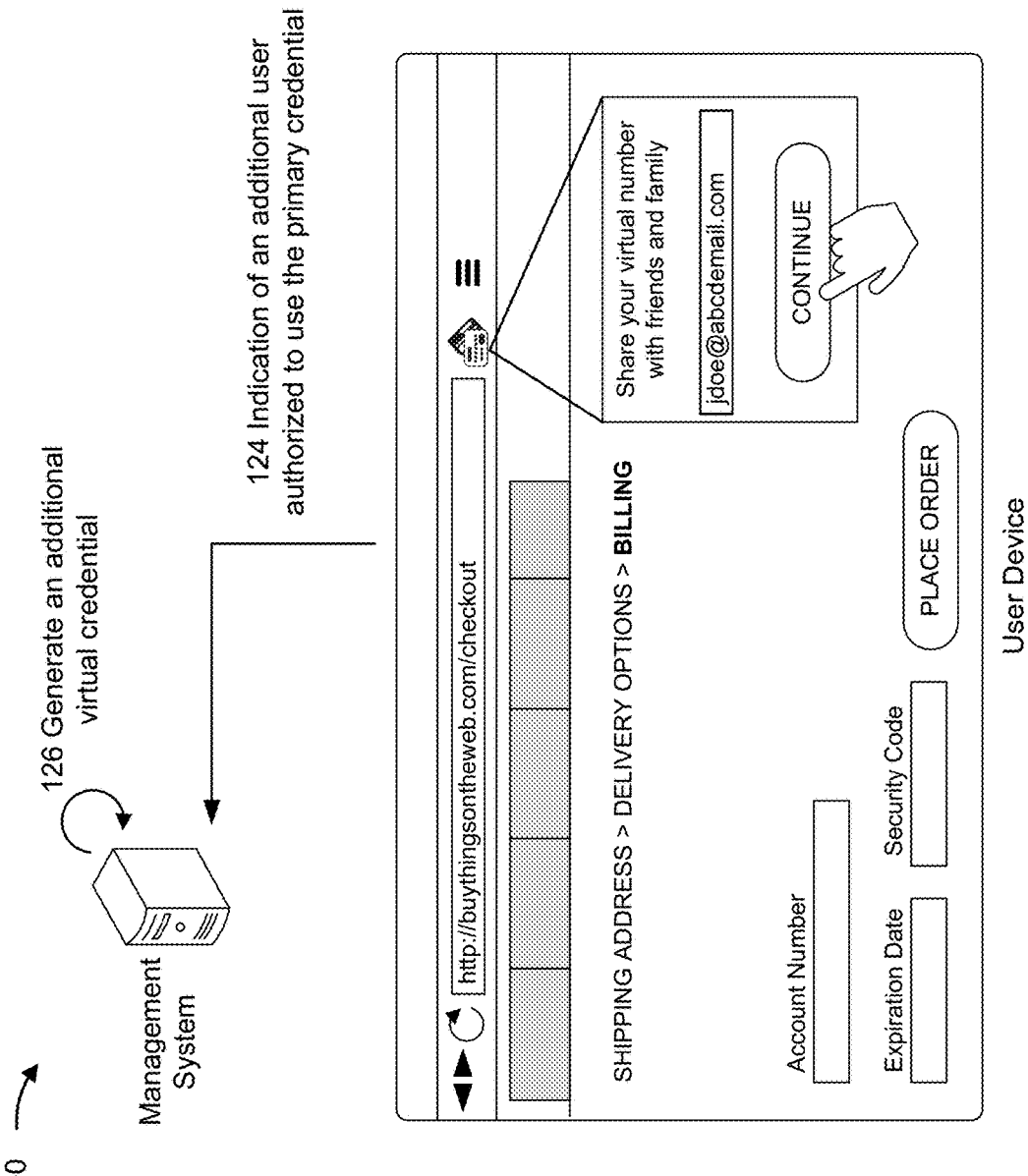

http://buythingsontheweb.com/checkout

SHIPPING ADDRESS > DELIVERY OPTIONS > BILLING

Share your virtual number
with friends and family jdoe@abcdemail.com

CONTINUE

Account Number

Expiration Date     Security Code

PLACE ORDER

User Device

Management System

130 Request for credentials stored in the credential manager

132 Information indicating the credentials

128 Detect user activity indicating a use of a credential

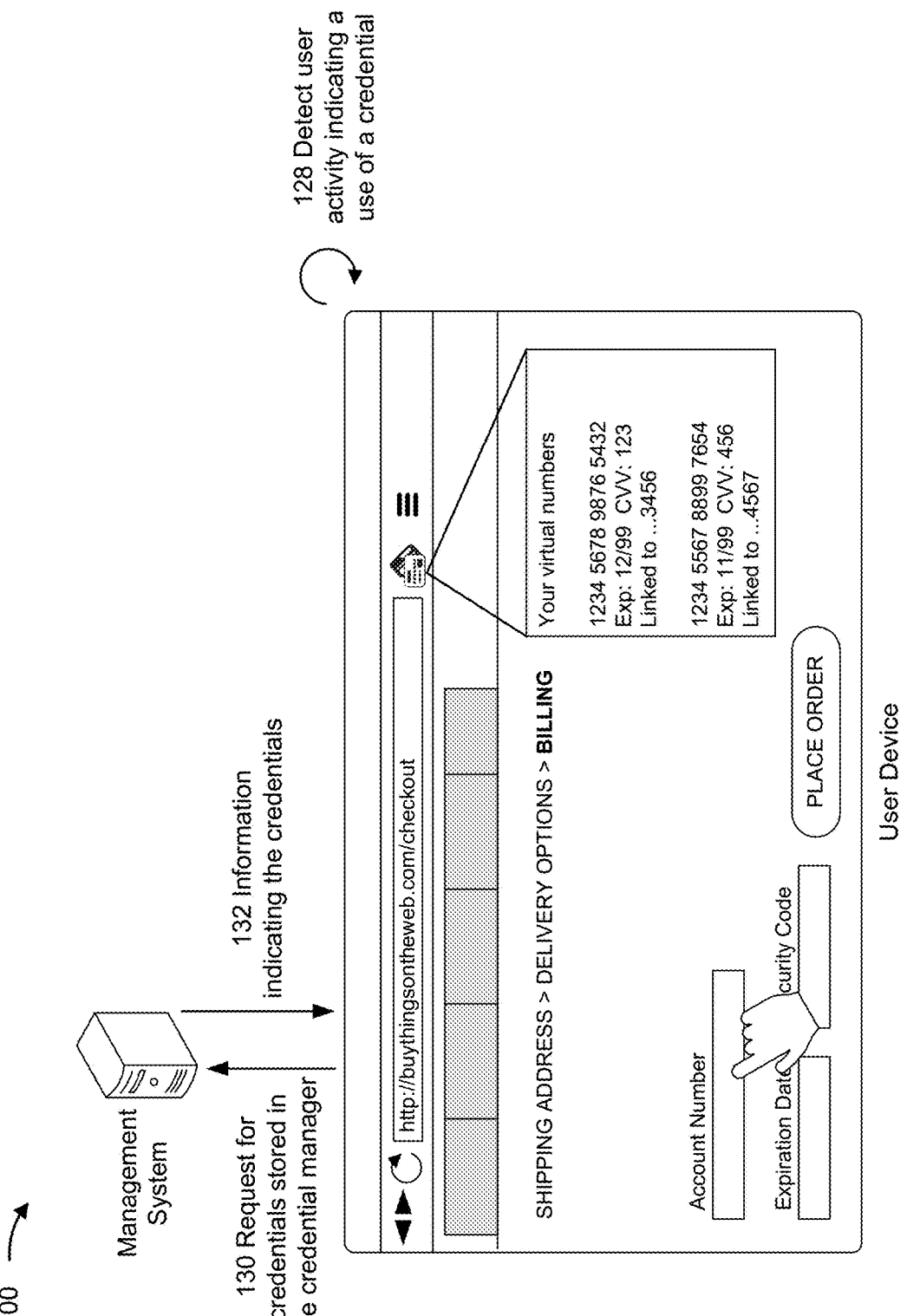

http://buythingsontheweb.com/checkout

SHIPPING ADDRESS > DELIVERY OPTIONS > BILLING

Your virtual numbers 1234 5678 9876 5432
Exp: 12/99  CVV: 123
Linked to ...3456

1234 5567 8899 7654
Exp: 11/99  CVV: 456
Linked to ...4567

Account Number

Expiration Date

Security Code

PLACE ORDER

User Device

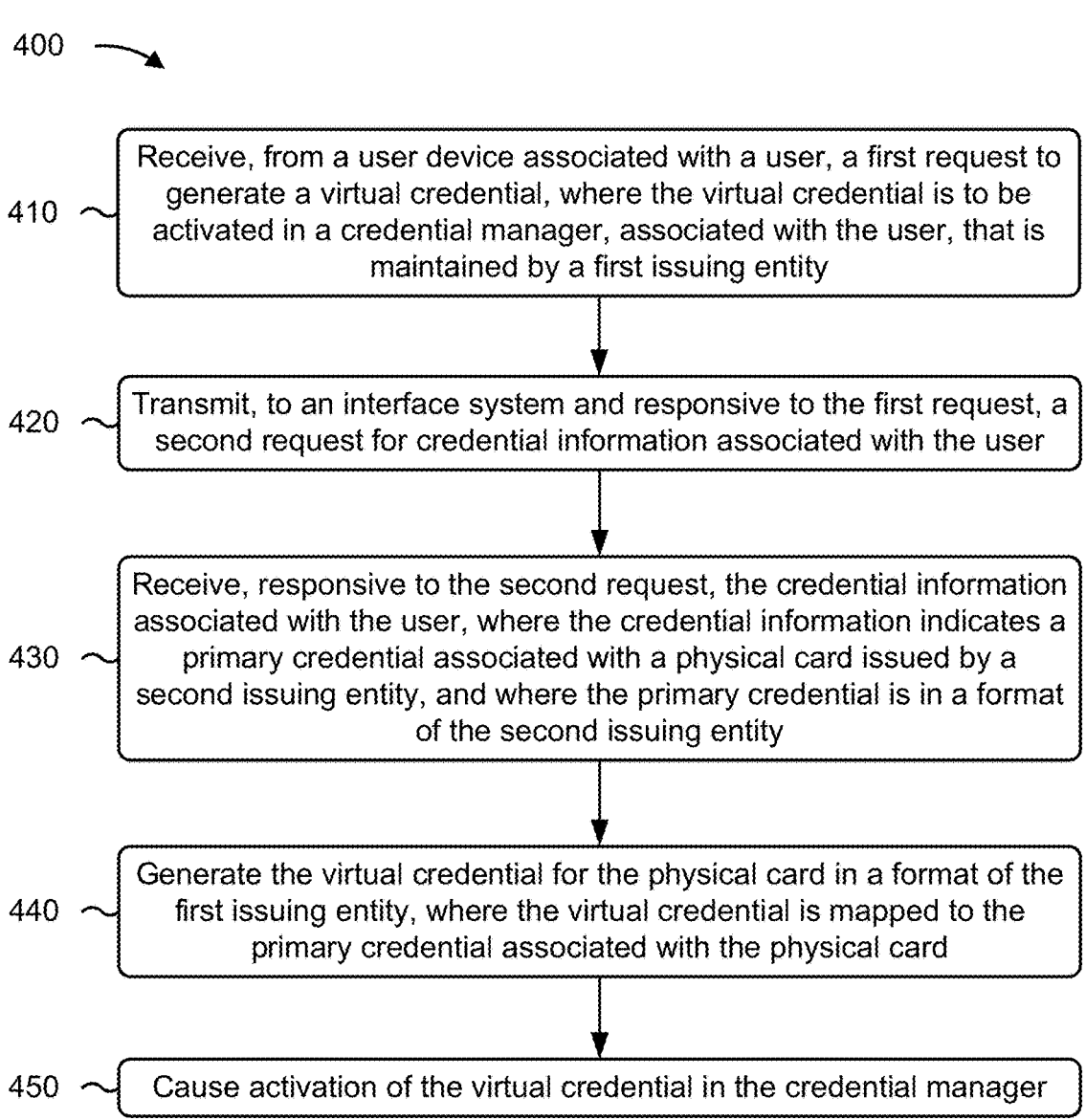

410 — Receive, from a user device associated with a user, a first request to generate a virtual credential, where the virtual credential is to be activated in a credential manager, associated with the user, that is maintained by a first issuing entity 420 — Transmit, to an interface system and responsive to the first request, a second request for credential information associated with the user 430 — Receive, responsive to the second request, the credential information associated with the user, where the credential information indicates a primary credential associated with a physical card issued by a second issuing entity, and where the primary credential is in a format of the second issuing entity 440 — Generate the virtual credential for the physical card in a format of the first issuing entity, where the virtual credential is mapped to the primary credential associated with the physical card 450 — Cause activation of the virtual credential in the credential manager

FIG. 4

INTER-ENTITY VIRTUAL CREDENTIAL GENERATION

BACKGROUND

A virtual credential, sometimes referred to as a virtual card number, is a computer-generated version of a primary credential. The virtual credential may be linked to the primary credential and used as a substitute for the primary credential in a web-based transaction. For example, an entity may issue a physical card, and a transaction management system of the entity may also generate one or more virtual credentials that can be used in place of the physical card.

SUMMARY

Some implementations described herein relate to a system for inter-entity virtual credential generation. The system may include one or more memories and one or more processors communicatively coupled to the one or more memories. The one or more processors may be configured to receive, from a user device associated with a user, a first request to generate a virtual credential, where the virtual credential is to be activated in a credential manager, associated with the user, that is maintained by a first issuing entity. The one or more processors may be configured to transmit, to an interface system and responsive to the first request, a second request for credential information associated with the user. The one or more processors may be configured to receive, responsive to the second request, the credential information associated with the user, where the credential information indicates a primary credential associated with a physical card issued by a second issuing entity, and where the primary credential is in a format of the second issuing entity. The one or more processors may be configured to generate the virtual credential for the physical card in a format of the first issuing entity, where the virtual credential is mapped to the primary credential associated with the physical card. The one or more processors may be configured to transmit, to the user device in connection with activation of the virtual credential in the credential manager, information identifying the virtual credential.

Some implementations described herein relate to a method of inter-entity virtual credential generation. The method may include receiving, by a device and from a user device associated with a user, a first request to generate a virtual credential, where the virtual credential is to be activated in a credential manager, associated with the user, that is maintained by a first issuing entity. The method may include transmitting, by the device to an interface system and responsive to the first request, a second request for credential information associated with the user. The method may include receiving, by the device and responsive to the second request, the credential information associated with the user, where the credential information indicates a primary credential associated with a physical card issued by a second issuing entity, and where the primary credential is in a format of the second issuing entity. The method may include generating, by the device, the virtual credential for the physical card in a format of the first issuing entity, where the virtual credential is mapped to the primary credential associated with the physical card. The method may include causing, by the device, activation of the virtual credential in the credential manager.

Some implementations described herein relate to a non-transitory computer-readable medium that stores a set of instructions. The set of instructions, when executed by one or more processors of a device, may cause the device to transmit, to an interface system, a request for credential information associated with a user. The set of instructions, when executed by one or more processors of the device, may cause the device to receive, responsive to the request, the credential information associated with the user, where the credential information indicates a primary credential associated with a physical card. The set of instructions, when executed by one or more processors of the device, may cause the device to generate a virtual credential for the physical card, where the virtual credential is mapped to the primary credential associated with the physical card. The set of instructions, when executed by one or more processors of the device, may cause the device to cause activation of the virtual credential in a credential manager associated with the user.

BRIEF DESCRIPTION OF THE DRAWINGS

FIGS. 1A-1G are diagrams of an example associated with inter-entity virtual credential generation, in accordance with some embodiments of the present disclosure.

FIG. 4 is a flowchart of an example process associated with inter-entity virtual credential generation, in accordance with some embodiments of the present disclosure.

DETAILED DESCRIPTION

Figure 1A:
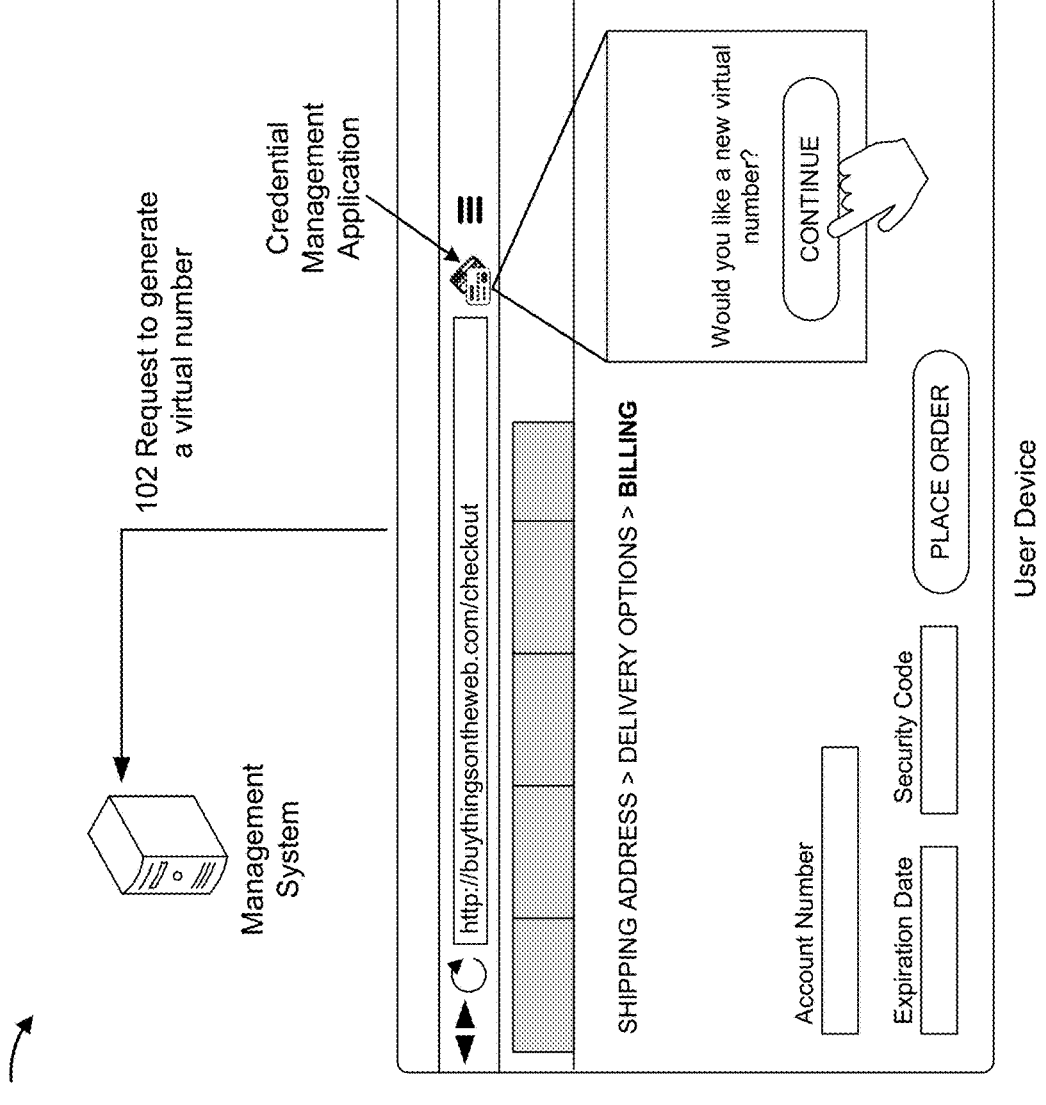

The following detailed description of example implementations refers to the accompanying drawings. The same reference numbers in different drawings may identify the same or similar elements.

As described above, a virtual credential is a computer-generated version of a primary credential (e.g., a credit card number) that may be linked to and used as a substitute for the primary credential in a web-based transaction. For example, an entity may issue a physical card (e.g., a credit card), and a transaction management system (e.g., a transaction backend system) of the entity may also generate one or more virtual credentials that can be used in place of the physical card. Each virtual credential may be linked to the primary credential in the transaction management system to enable transactions using a particular virtual credential to be applied to an account associated with the primary credential.

Accordingly, because a virtual credential can generally be used in the same way as a primary credential, virtual credentials can offer increased security. For example, if a data breach of a computing system were to result in a virtual credential being exposed or otherwise compromised (e.g., to a hacker or a fraudster), the virtual credential may be invalidated and a new virtual credential may be generated without affecting the primary credential and/or any other virtual credentials that may be linked to the primary credential. In this way, the virtual credential may reduce a risk and/or an extent to which the virtual credential can be fraudulently used, thereby improving information security of a computing system and/or reducing utilization of computing resources (e.g., processor resources and/or memory resources) and/or network resources that may otherwise be used for fraud detection and remediation and/or used for updating many different computing systems with new credentials.

However, in some cases, a virtual credential may not be used in place of a primary credential. For example, an issuer of a physical card associated with the primary credential may have systems to handle transactions involving credentials, but may lack systems used for generating virtual credentials and linking the generated virtual credentials to primary credentials. Furthermore, there may be incompatibilities between a system capable of generating virtual credentials and a system the handles transactions involving credentials when these systems are implemented by different entities. Accordingly, integrations between these systems may be technically difficult and/or may involve extensive inter-system communication (e.g., via one or more application programming interfaces (APIs)) to coordinate the generation of a virtual credential and the linking of the virtual credential to a primary credential, thereby consuming significant network resources and/or computing resources.

Some implementations described herein enable a virtual credential (e.g., a virtual card number) to be assigned to a physical card issued by an entity that does not support virtual credentials. In some implementations, a system associated with a first issuing entity (e.g., an entity that issues physical cards) may obtain information, associated with a user, identifying a primary credential of a physical card (e.g., a transaction card) from a system associated with a second issuing entity by exchanging communications with an interface system (e.g., a system that facilitates inter-system communication via one or more APIs).

The physical card may be issued by the second issuing entity, and therefore the primary credential may be in a format used by the second issuing entity. Using the information, the system may generate a virtual credential for the physical card that is in a format used by the first issuing entity. By using the format of the first issuing entity, the virtual credential may be compatible with transaction processing systems capable of handling the processing of credentials associated with the first issuing entity. Otherwise, if the format of the first issuing entity was not used for the virtual credential (e.g., if the virtual credential is an unformatted number), the transaction processing systems may reject the virtual credential or may be unable to properly route transactions for settlement.

By using the format of the first issuing entity, compatibility between unrelated systems may be improved while reducing transaction processing and/or routing errors. Furthermore, inter-system communications that would otherwise be performed to coordinate the assigning of a virtual credential by one entity for a physical card issued by another entity can be reduced. Accordingly, techniques described herein reduce the consumption of computing resources and/or network resources that may otherwise be expended as a result of incompatibilities between systems in connection with assigning virtual credentials.

FIGS. 1A-1G are diagrams of an example 100 associated with inter-entity virtual credential generation. As shown in FIGS. 1A-1G, example 100 includes a management system, a user device, an interface system, a transaction system, and a processing system. These devices are described in more detail in connection with FIGS. 2 and 3.

The user device may be associated with a user that has been issued one or more physical cards (e.g., transaction cards, such as credit cards) by one or more issuing entities (e.g., financial institutions). The management system may be associated with a first issuing entity. The first issuing entity may be an issuer of physical cards (e.g., transaction cards, such as credit cards), such as a financial institution. The first issuing entity may be associated with one or more systems (e.g., the management system) that support generating and linking of virtual credentials. In addition, the first issuing entity may maintain a plurality of credential managers for a plurality of users (e.g., by transmitting, receiving, storing, and/or updating data relating to the credential managers and the credentials thereof). For example, a credential manager associated with the user may be used to store one or more primary credentials and/or one or more virtual credentials, associated with the physical cards issued to the user, for use in connection with web-based transactions. In some implementations, the credential manager may be implemented in a credential manager application on the user device. The credential manager application may be a browser extension of a web browser of the user device, a mobile application, or the like. The credential manager application may be configured to communicate with the management system.

The processing system may be associated with a second issuing entity. The second issuing entity may also be an issuer of physical cards, in a similar manner as described above. However, the second issuing entity may be different from the first issuing entity that maintains the credential manager associated with the user. The processing system associated with the second issuing entity may be configured to process transactions that use credentials associated with physical cards, but the processing system may lack a capability to assign virtual credentials (e.g., may lack support for generating and linking of virtual credentials). The interface system may facilitate information exchanges (e.g., of account information, credential information, or the like) between the first issuing entity and the second issuing entity (e.g., using one or more APIs). The interface system may be associated with the second entity or a third-party entity (e.g., an intermediary entity).

As shown in FIG. 1A, and by reference number 102, the user device may transmit, and the management system may receive, a request to generate a virtual credential. For example, the user device may transmit the request responsive to a user input to the credential manager application indicating that a virtual credential is to be generated. In some implementations, the user input may be made via a user interface element of the credential manager application that provides an option to generate a virtual credential. The user interface element may be presented on the user device responsive to detection of user activity that includes entering information in one or more fields of an electronic form and/or that includes accessing an electronic form that includes one or more fields designated for information relating to a credential, as described herein.

Figure 1B:
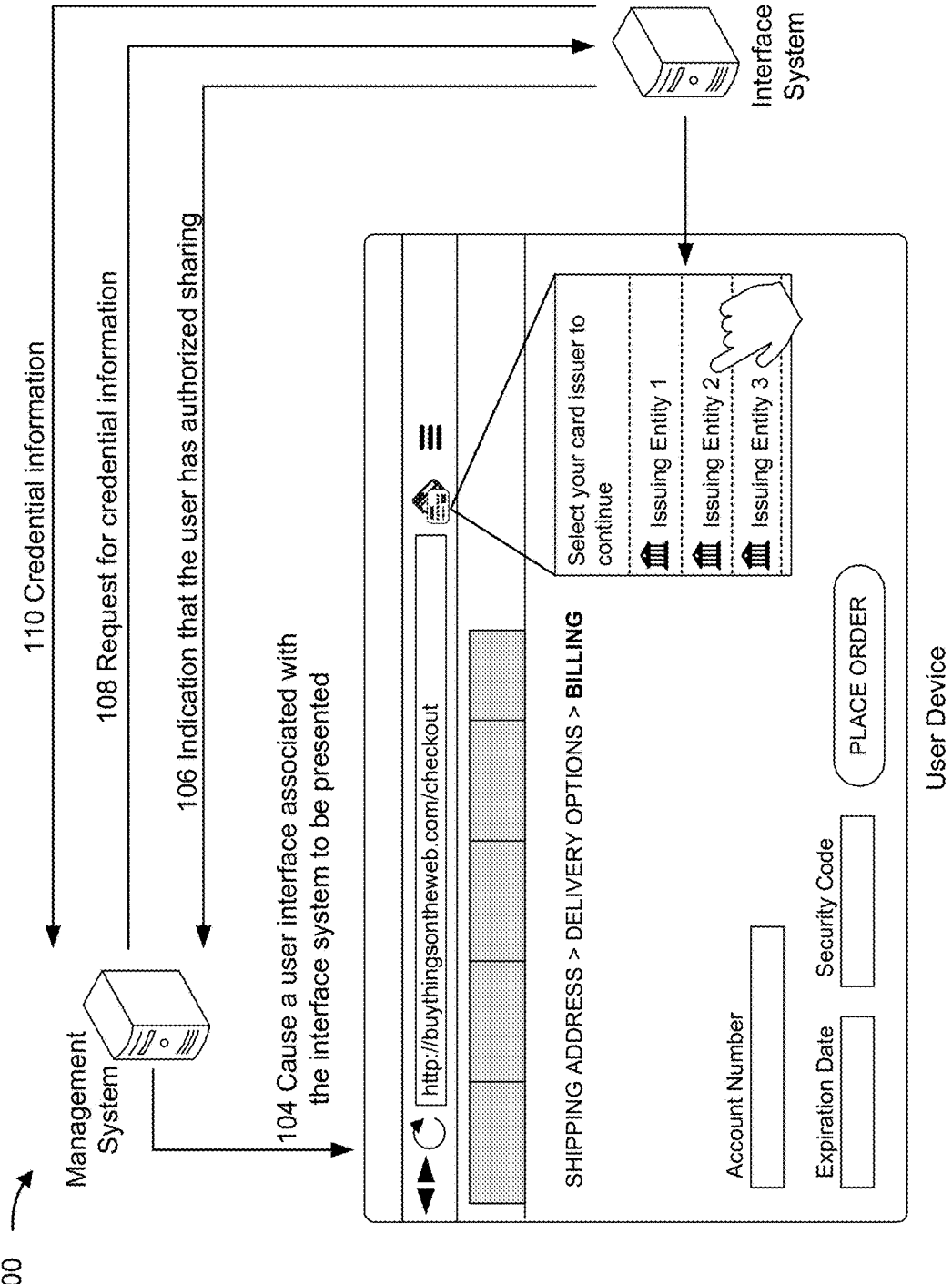

As shown in FIG. 1B, and by reference number 104, responsive to the request, the management system may cause a user interface associated with the interface system to be presented on the user device. For example, the management system may cause redirection of the user device to the user interface, may cause the user interface to be launched on the user device, or the like. The management system may cause the user interface to be presented on the user device via the credential manager application. For example, the management system may transmit a message to the user device via the credential manager application to cause the user interface to be presented on the user device.

The user interface may facilitate communication between the user device and the interface system. For example, the user interface may be configured to obtain user inputs (e.g., via one or more fields of an electronic form, selectable options, or the like) relating to the sharing of the user's credential information with the credential manager.

In some implementations, via the user interface, the user device may provide, to the interface system, an indication (e.g., according to a user input) of one or more issuing entities having credential information that the user would like to share with the credential manager. In some implementations, via the user interface, the user device may provide, to the interface system, authentication information (e.g., a username and password) to enable the interface system to access account details of an account of the user that is maintained by an issuing entity. In some implementations, via the user interface, the user device may provide, to the interface system, an indication (e.g., according to a user input) of one or more physical cards for which the user would like to share credential information with the credential manager. As shown by reference number 106, the management system may receive, from the interface system, an indication that the user has authorized sharing of credential information with the credential manager.

As shown by reference number 108, the management system may transmit, to the interface system, a request for credential information associated with the user. For example, the management system may transmit the request responsive to receiving the request to generate a virtual credential from the user device. Moreover, the management system may transmit the request after receiving the indication, from the interface system, that the user has authorized sharing of credential information.

As shown by reference number 110, the management system may receive, from the interface system responsive to the request, the credential information associated with the user. The credential information may indicate one or more primary credentials associated with one or more physical cards issued to the user by one or more issuing entities. In some implementations, the credential information may indicate a primary credential associated with a physical card issued to the user by the second issuing entity. The physical card may include a transaction card, such as a credit card, a debit card, a bank card, a rewards card, a gift card, an identification card, or the like.

The primary credential may be numeric. For example, the primary credential may include an account number (e.g., a personal account number) associated with the physical card, an identification number associated with the physical card, an expiration date associated with the physical card, and/or a security code associated with the physical card. In some implementations, the primary credential may be in a format of the second issuing entity (e.g., the format of the primary credential may indicate that the second issuing entity is the issuer of the physical card). For example, each issuing entity may use a particular format for a primary credential to indicate that the physical card was issued by that issuing entity. As an example, different issuing entities may use different numeric patterns for a primary credential (e.g., one issuing entity may use a first particular number as a first digit of an account number, and another issuing entity may use a second particular number as a first digit of an account number) and/or may use different length numbers for a primary credential (e.g., one issuing entity may use a three digit security code and another issuing entity may use a four digit security code).

In addition or alternatively to receiving the credential information from the interface system, the management system may receive the credential information from the user device. In some implementations, the user device may obtain a user input indicating the primary credential, and the user device may transmit the credential information indicating the primary credential to the management system (e.g., via the credential manager application). In some implementations, the user device (e.g., as directed by the user) may capture an image of the physical card. The user device may process the image (e.g., using an image segmentation technique, an object recognition technique, and/or an optical character recognition technique, among other examples) to extract the primary credential from the image, and the user device may transmit the credential information indicating the primary credential to the management system (e.g., via the credential manager application). Alternatively, the user device may transmit the image to the management system (e.g., via the credential manager application), and the management system may process the image, as described above, to extract the primary credential from the image.

Figure 1C:
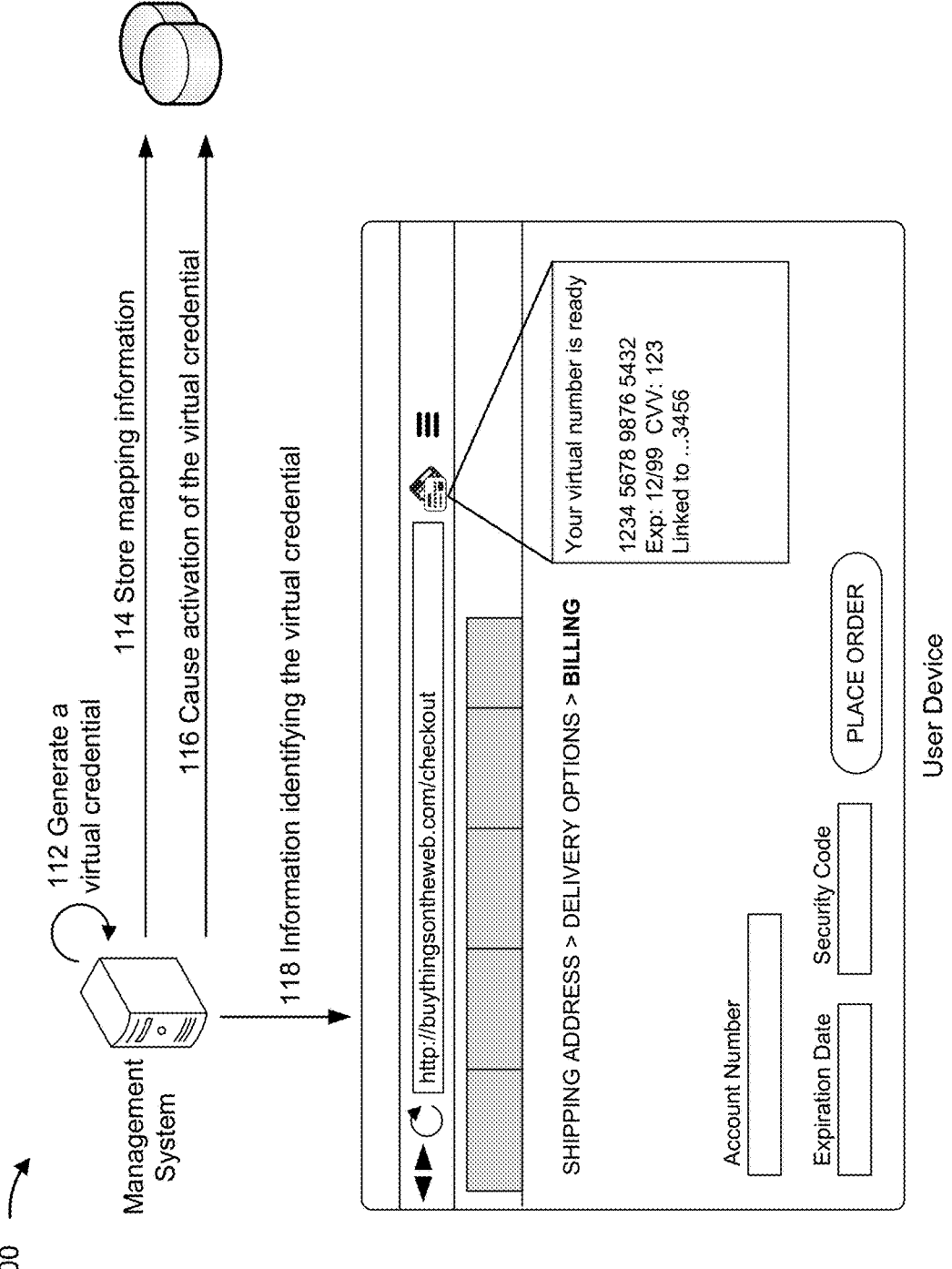

As shown in FIG. 1C, and by reference number 112, the management system may generate a virtual credential for the physical card. The virtual credential may be numeric. For example, the virtual credential may include a credential number (e.g., a virtual account number, a virtual personal account number, a virtual identification number, or the like), an expiration date for the credential number, and/or a security code associated with the credential number. The management system may generate the virtual credential in a format of the first issuing entity that maintains the credential manager. For example, the format of the first issuing entity may be different from the format of the second issuing entity. By using the format of the first issuing entity for the virtual credential, the virtual credential may appear to be for a physical card issued by the first issuing entity, even though the virtual credential is actually for the physical card issued by the second issuing entity. Accordingly, transactions performed using the virtual credential can be processed as though the physical card was issued by the first issuing entity (e.g., having systems that support virtual credentials), even though the physical card was issued by the second issuing entity (e.g., having systems that do not support virtual credentials).

The virtual credential may be mapped to the primary credential associated with the physical card, thereby enabling the use of the virtual credential in place of the primary credential. For example, as shown by reference number 114, after generating the virtual credential, the management system may store mapping information (e.g., in a data structure, such as a database) indicating that the virtual credential is mapped to the primary credential associated with the physical card. As shown by reference number 116, the management system may cause activation of the virtual credential in the credential manager associated with the user. For example, to activate the virtual credential in the credential manager, the management system may generate a record (e.g., in a data structure, such as a database) indicating that the virtual credential is associated with the user's credential manager (e.g., by using a credential manager identifier in the record) and/or is associated with the user (e.g., by using a user identifier in the record). The record may also indicate an activation time for the virtual credential, an expiration time for the virtual credential, one or more merchants at which the virtual credential may be used, one or more merchants at which the virtual credential cannot be used, or the like. Activation of the virtual credential may make the virtual credential active in the credential manager and usable by the user.

The credential manager associated with the user may store multiple virtual credentials. For example, the credential manager associated with the user may store the virtual credential and an additional virtual credential for an additional physical card issued by the first issuing entity (e.g., the first issuing entity may assign virtual credentials to physical cards issued by the first issuing entity as well as to physical cards issued by other issuing entities, such as the second issuing entity).

As shown by reference number 118, the management system may transmit, and the user device may receive (e.g., via the credential manager application), information identifying the virtual credential. The management system may transmit the information in connection with activation of the virtual credential. For example, the information may cause the virtual credential to appear in the credential manager associated with the user. As an example, the information may cause the user device to present an option (e.g., a user interface element) identifying the virtual credential in a user interface of the credential manager application. The option may be configured to automatically populate fields of an electronic form (e.g., of a web page) with the virtual credential responsive to a selection of the option by the user.

Figure 1D:
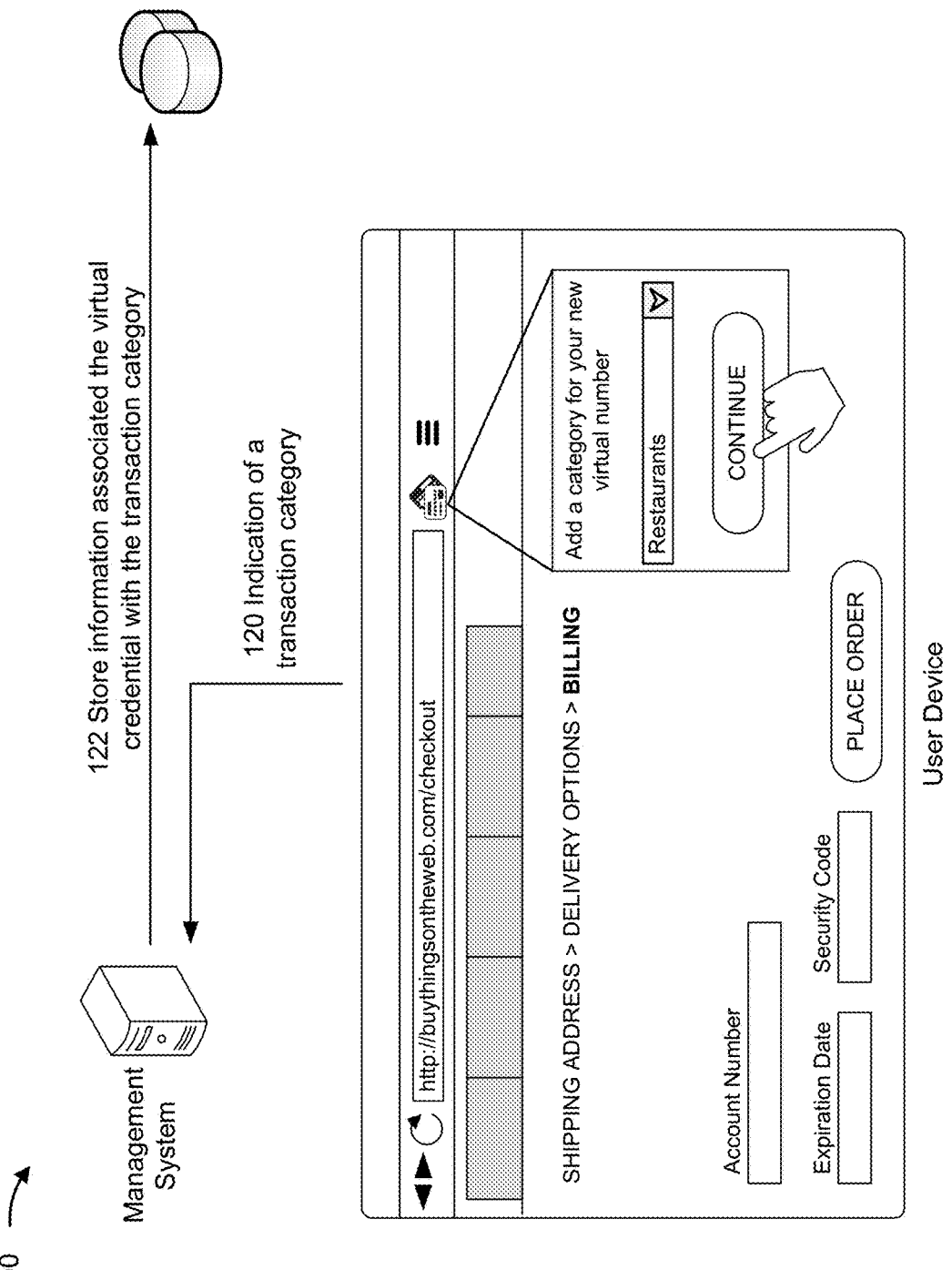

As shown in FIG. 1D, and by reference number 120, the user device may transmit, and the management system may receive (e.g., via the credential manager application), an indication of a transaction category (e.g., a travel category or a restaurant category) for the virtual credential. For example, the indication may indicate that the virtual credential is one of the user's preferred credentials for executing transactions in the transaction category. As shown by reference number 122, the management system may store information associating the virtual credential with the transaction category.

As shown in FIG. 1E, and by reference number 124, the user device may transmit, and the management system may receive (e.g., via the credential manager application), an indication of an additional user that is authorized to use the primary credential associated with the physical card. For example, the indication may indicate an email address, a username, a user identifier, or the like, associated with the additional user. The indication may further indicate a credential expiration, a spending limit, one or more authorized categories, one or more authorized merchants, or the like, for the additional user. The additional user may also use an additional credential manager maintained by the first issuing entity.

As shown by reference number 126, responsive to the indication, the management system may generate an additional virtual credential for the additional credential manager associated with the additional user. The additional virtual credential may be in the format of the first issuing entity, as described herein. In a similar manner as described above, the management system may store mapping information indicating that the additional virtual credential is mapped to the primary credential associated with the physical card, and the management system may cause activation of the additional virtual credential in the additional credential manager associated with the additional user. In a similar manner as described above, the management system may transmit, and an additional user device associated with the additional user may receive (e.g., via a credential manager application), information identifying the additional virtual credential.

As shown in FIG. 1F, and by reference number 128, the user device, using the credential manager application, may detect user activity indicating a use of a credential. For example, the user device may detect user activity that includes entering payment information (e.g., a transaction card number) in one or more fields of an electronic form presented on the user device and/or that includes accessing an electronic form that includes one or more fields designated for payment information. For example, the user device, using the credential manager application, may detect that a current web page presented on the user device includes an account number field, an expiration date field, a security code field, user interface elements (e.g., text and/or images) that relate to one or more items to be purchased (e.g., items in a shopping cart), text indicating that the current web page is for entering billing information, and/or one or more interactive elements (e.g., a button) to place an order.

As shown by reference number 130, responsive to detecting the user activity, the user device may transmit, and the management system may receive (e.g., via the credential manager application), a request for credentials stored in the credential manager associated with the user. As shown by reference number 132, responsive to the request, the management system may transmit, and the user device may receive (e.g., via the credential manager application), information indicating the credentials stored in the credential manager associated with the user. For example, the information may indicate one or more virtual credentials (and/or one or more primary credentials). Moreover, the information may indicate, for each virtual credential, a transaction category associated with the virtual credential (e.g., based on information associating virtual credentials with transaction categories, as described herein).

The user device, upon receiving the information indicating the credentials, may cause the credential manager application to present a user interface or otherwise present options indicating one or more virtual credentials stored by the credential manager that can be entered in the one or more fields. Furthermore, each option may be configured to automatically fill the one or more fields with a corresponding virtual credential responsive to a selection of the option by the user. In some implementations, the credential manager application may order the options according to the transaction categories that have been associated with the virtual credentials. For example, the user device may identify an entity associated with the electronic form (e.g., based on a web address associated with a web page that includes the electronic form, based on parsing content of the web page, and/or based on metadata for the web page, among other examples), and the user device may identify a transaction category associated with the entity (e.g., using a look-up table, using a merchant code associated with the entity, or the like). Accordingly, one or more virtual credentials associated with the same transaction category as the entity may be presented as the top options. Alternatively, the user device, using the credential manager application, may automatically populate the one or more fields with a virtual credential associated with the same transaction category as the entity.

Figure 1G:
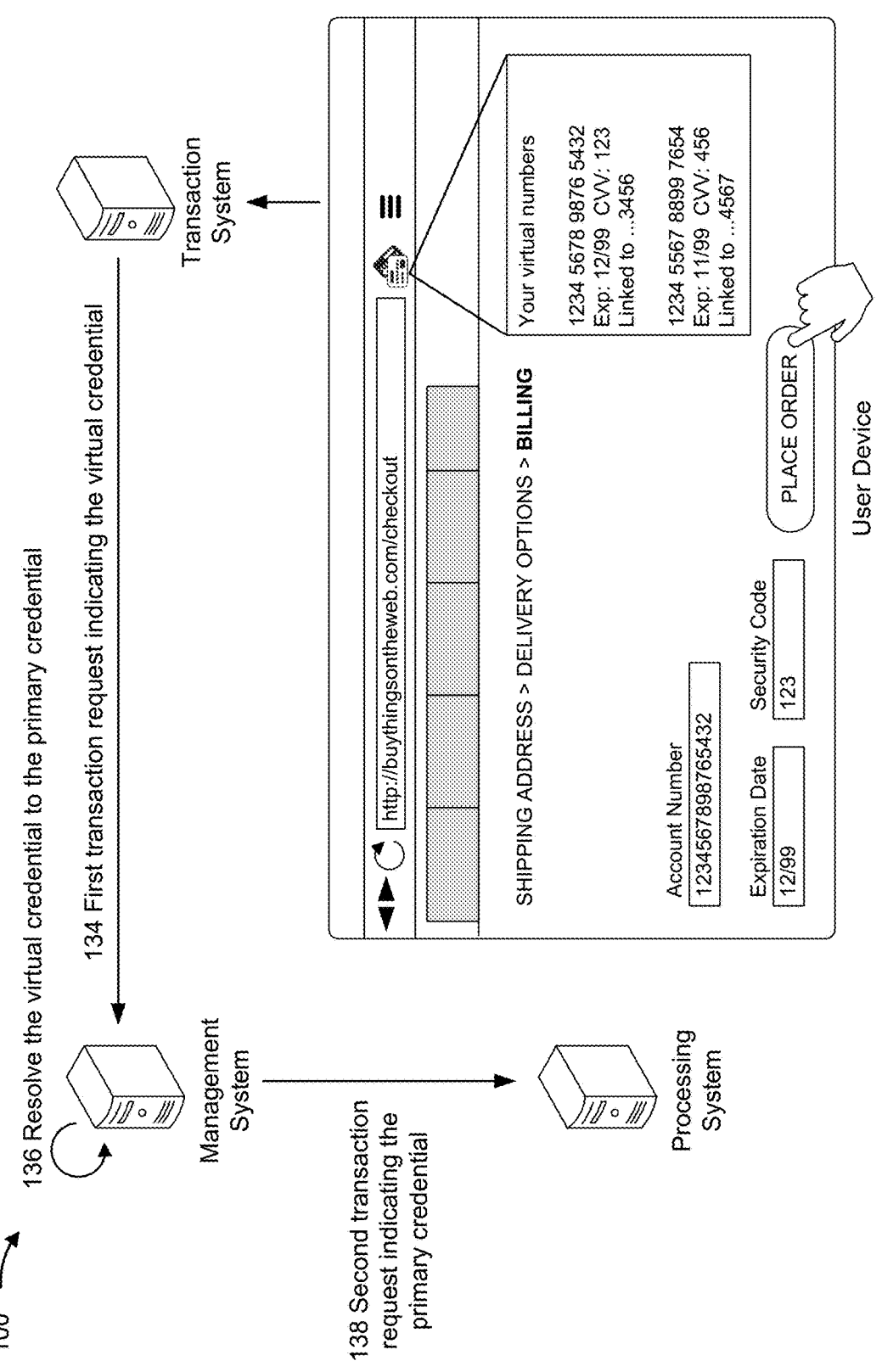

The user device may checkout with the entity using the virtual credential (e.g., by submitting the electronic form with the one or more fields populated with the virtual credential). The use of the virtual credential may be transparent to the entity (e.g., the virtual credential may appear to the entity as being a primary credential issued by the first issuing entity due to the virtual credential being in the format of the first issuing entity). As shown in FIG. 1G, and by reference number 134, the management system may receive, from the transaction system, a first transaction request indicating the virtual credential. The first transaction request may be an authorization request or a settlement request in connection with the user device using the virtual credential to checkout with the entity. The first transaction request may be routed to the management system (e.g., rather than to the processing system of the second issuing entity) based on the virtual credential having the format of the first issuing entity.

As shown by reference number 136, responsive to the first transaction request, the management system may resolve the virtual credential to the primary credential associated with the physical card. For example, the management system may resolve the virtual credential to the primary credential using the mapping information stored by the management system. As shown by reference number 138, the management system may transmit, to the processing system associated with second issuing entity, a second transaction request indicating the primary credential associated with the physical card. The second transaction request may be an authorization request or a settlement request in accordance with the first transaction request. Accordingly, the processing system associated with the second issuing entity may provide an authorization indication or process a settlement of the charges associated with the transaction.

Using the format of the first issuing entity for the virtual credential (even though the physical card is issued by the second issuing entity) improves compatibility between unrelated systems while reducing transaction processing and/or routing errors that may occur at the transaction system. Accordingly, techniques described herein reduce the consumption of computing resources and/or network resources that may otherwise be expended as a result of incompatibilities between systems in connection with assigning virtual credentials.

As indicated above, FIGS. 1A-1G are provided as an example. Other examples may differ from what is described with regard to FIGS. 1A-1G.

Figure 2:
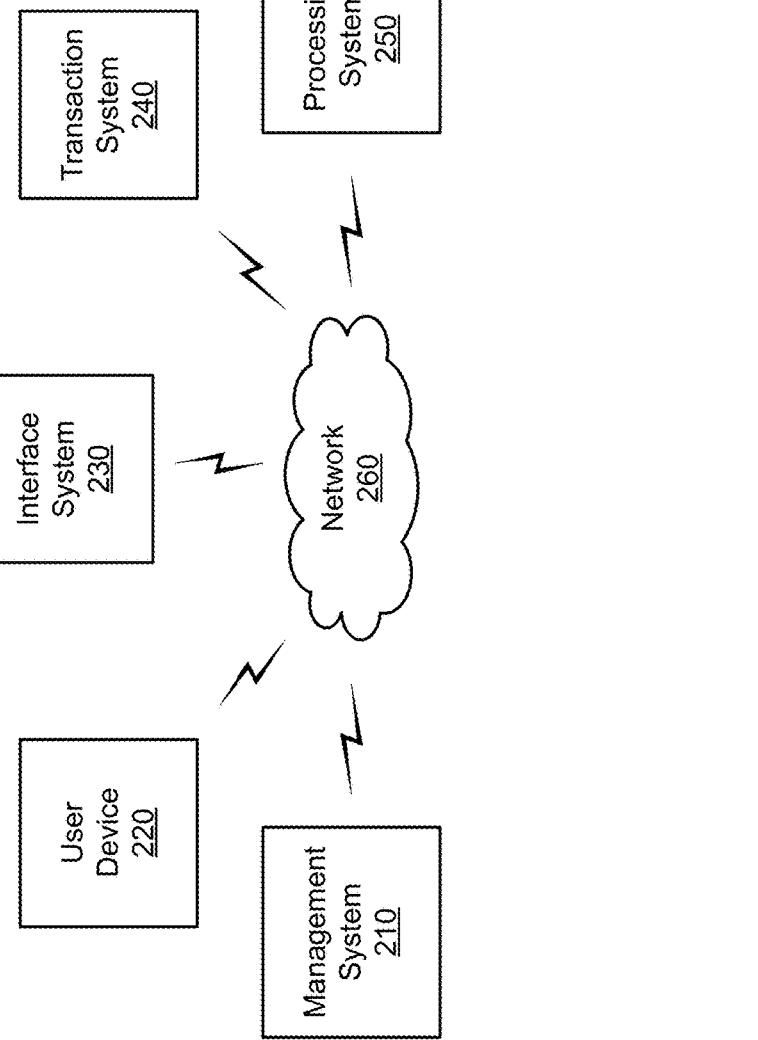
FIG. 2 is a diagram of an example environment in which systems and/or methods described herein may be implemented, in accordance with some embodiments of the present disclosure.

FIG. 2 is a diagram of an example environment 200 in which systems and/or methods described herein may be implemented. As shown in FIG. 2, environment 200 may include a management system 210, a user device 220, an interface system 230, a transaction system 240, a processing system 250, and a network 260. Devices of environment 200 may interconnect via wired connections, wireless connections, or a combination of wired and wireless connections.

The management system 210 may include one or more devices capable of receiving, generating, storing, processing, providing, and/or routing information associated with inter-entity virtual credential generation, as described elsewhere herein. The management system 210 may include a communication device and/or a computing device. For example, the management system 210 may include a server, such as an application server, a client server, a web server, a database server, a host server, a proxy server, a virtual server (e.g., executing on computing hardware), or a server in a cloud computing system. In some implementations, the management system 210 may include computing hardware used in a cloud computing environment.

The user device 220 may include one or more devices capable of receiving, generating, storing, processing, and/or providing information associated with inter-entity virtual credential generation, as described elsewhere herein. The user device 220 may include a communication device and/or a computing device. For example, the user device 220 may include a wireless communication device, a mobile phone, a user equipment, a laptop computer, a tablet computer, a desktop computer, a gaming console, a set-top box, a wearable communication device (e.g., a smart wristwatch, a pair of smart eyeglasses, a head mounted display, or a virtual reality headset), or a similar type of device.

The interface system 230 may include one or more devices capable of receiving, generating, storing, processing, and/or routing information associated with inter-system communication (e.g., between one or more systems of the first issuing entity and one or more systems of the second issuing entity), as described elsewhere herein. The interface system 230 may include a communication device and/or a computing device. For example, the interface system 230 may include a server, such as an application server, a client server, a web server, a database server, a host server, a proxy server, a virtual server (e.g., executing on computing hardware), or a server in a cloud computing system. In some implementations, the interface system 230 may include computing hardware used in a cloud computing environment.

The transaction system 240 may include one or more devices capable of receiving, generating, storing, processing, providing, and/or routing information associated with transaction processing, as described elsewhere herein. The transaction system 240 may include a communication device and/or a computing device. For example, the transaction system 240 may include a server, such as an application server, a client server, a web server, a database server, a host server, a proxy server, a virtual server (e.g., executing on computing hardware), or a server in a cloud computing system. In some implementations, the transaction system 240 may include computing hardware used in a cloud computing environment.

The processing system 250 may include one or more devices capable of receiving, generating, storing, processing, providing, and/or routing information associated with transaction processing, as described elsewhere herein. The processing system 250 may include a communication device and/or a computing device. For example, the processing system 250 may include a server, such as an application server, a client server, a web server, a database server, a host server, a proxy server, a virtual server (e.g., executing on computing hardware), or a server in a cloud computing system. In some implementations, the processing system 250 may include computing hardware used in a cloud computing environment.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
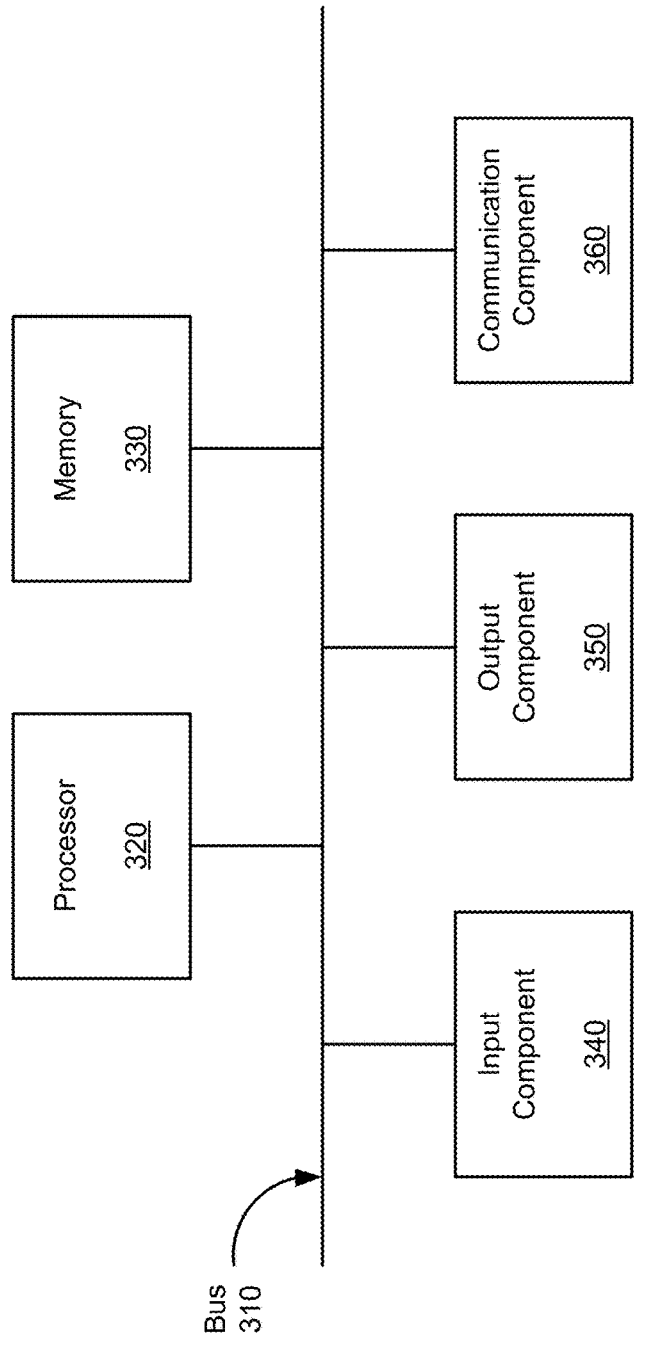
FIG. 3 is a diagram of example components of a device associated with inter-entity virtual credential generation, in accordance with some embodiments of the present disclosure.

FIG. 3 is a diagram of example components of a device 300 associated with inter-entity virtual credential generation. The device 300 may correspond to management system 210, user device 220, interface system 230, transaction system 240, and/or processing system 250. In some implementations, management system 210, user device 220, interface system 230, transaction system 240, and/or processing system 250 may include one or more devices 300 and/or one or more components of the device 300. As shown in FIG. 3, the device 300 may include a bus 310, a processor 320, a memory 330, an input component 340, an output component 350, and/or a communication component 360.

The bus 310 may include one or more components that enable wired and/or wireless communication among the components of the device 300. The bus 310 may couple together two or more components of FIG. 3, such as via operative coupling, communicative coupling, electronic coupling, and/or electric coupling. For example, the bus 310 may include an electrical connection (e.g., a wire, a trace, and/or a lead) and/or a wireless bus. The processor 320 may include a central processing unit, a graphics processing unit, a microprocessor, a controller, a microcontroller, a digital signal processor, a field-programmable gate array, an application-specific integrated circuit, and/or another type of processing component. The processor 320 may be implemented in hardware, firmware, or a combination of hardware and software. In some implementations, the processor 320 may include one or more processors capable of being programmed to perform one or more operations or processes described elsewhere herein.

The memory 330 may include volatile and/or nonvolatile memory. For example, the memory 330 may include random access memory (RAM), read only memory (ROM), a hard disk drive, and/or another type of memory (e.g., a flash memory, a magnetic memory, and/or an optical memory). The memory 330 may include internal memory (e.g., RAM, ROM, or a hard disk drive) and/or removable memory (e.g., removable via a universal serial bus connection). The memory 330 may be a non-transitory computer-readable medium. The memory 330 may store information, one or more instructions, and/or software (e.g., one or more software applications) related to the operation of the device 300. In some implementations, the memory 330 may include one or more memories that are coupled (e.g., communicatively coupled) to one or more processors (e.g., processor 320), such as via the bus 310. Communicative coupling between a processor 320 and a memory 330 may enable the processor 320 to read and/or process information stored in the memory 330 and/or to store information in the memory 330.

The input component 340 may enable the device 300 to receive input, such as user input and/or sensed input. For example, the input component 340 may include a touch screen, a keyboard, a keypad, a mouse, a button, a microphone, a switch, a sensor, a global positioning system sensor, a global navigation satellite system sensor, an accelerometer, a gyroscope, and/or an actuator. The output component 350 may enable the device 300 to provide output, such as via a display, a speaker, and/or a light-emitting diode. The communication component 360 may enable the device 300 to communicate with other devices via a wired connection and/or a wireless connection. For example, the communication component 360 may include a receiver, a transmitter, a transceiver, a modem, a network interface card, and/or an antenna.

The device 300 may perform one or more operations or processes described herein. For example, a non-transitory computer-readable medium (e.g., memory 330) may store a set of instructions (e.g., one or more instructions or code) for execution by the processor 320. The processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry may be used instead of or in combination with the instructions to perform one or more operations or processes described herein. Additionally, or alternatively, the processor 320 may be configured to perform one or more operations or processes described herein. Thus, implementations described herein are not limited to any specific combination of hardware circuitry and software.

The number and arrangement of components shown in FIG. 3 are provided as an example. The device 300 may include additional components, fewer components, different components, or differently arranged components than those shown in FIG. 3. Additionally, or alternatively, a set of components (e.g., one or more components) of the device 300 may perform one or more functions described as being performed by another set of components of the device 300.

FIG. 4 is a flowchart of an example process 400 associated with inter-entity virtual credential generation. In some implementations, one or more process blocks of FIG. 4 may be performed by the management system 210. In some implementations, one or more process blocks of FIG. 4 may be performed by another device or a group of devices separate from or including the management system 210, such as the user device 220, the interface system 230, the transaction system 240, and/or the processing system 250. Additionally, or alternatively, one or more process blocks of FIG. 4 may be performed by one or more components of the device 300, such as processor 320, memory 330, input component 340, output component 350, and/or communication component 360.

As shown in FIG. 4, process 400 may include receiving, from a user device associated with a user, a first request to generate a virtual credential, where the virtual credential is to be activated in a credential manager, associated with the user, that is maintained by a first issuing entity (block 410). For example, the management system 210 (e.g., using processor 320, memory 330, and/or communication component 360) may receive, from a user device associated with a user, a first request to generate a virtual credential, as described above in connection with reference number 102 of FIG. 1A. As an example, the user device may transmit the request responsive to a user input to a credential manager application (e.g., a browser extension of a web browser on the user device) indicating that a virtual credential is to be generated. In some implementations, the virtual credential is to be activated in a credential manager, associated with the user, that is maintained by a first issuing entity.

As further shown in FIG. 4, process 400 may include transmitting, responsive to the first request, a second request for credential information associated with the user (block 420). For example, the management system 210 (e.g., using processor 320, memory 330, and/or communication component 360) may transmit, responsive to the first request, a second request for credential information associated with the user, as described above in connection with reference number 108 of FIG. 1B. As an example, the second request may be transmitted after receiving an indication that the user has authorized sharing of credential information.

As further shown in FIG. 4, process 400 may include receiving, responsive to the second request, the credential information associated with the user, where the credential information indicates a primary credential associated with a physical card issued by a second issuing entity, and where the primary credential is in a format of the second issuing entity (block 430). For example, the management system 210 (e.g., using processor 320, memory 330, and/or communication component 360) may receive, responsive to the second request, the credential information associated with the user, as described above in connection with reference number 110 of FIG. 1B. As an example, the credential information may indicate one or more primary credentials associated with one or more physical cards issued to the user by one or more issuing entities. In some implementations, the credential information indicates a primary credential associated with a physical card issued by a second issuing entity. In some implementations, the primary credential is in a format of the second issuing entity.

As further shown in FIG. 4, process 400 may include generating the virtual credential for the physical card in a format of the first issuing entity, where the virtual credential is mapped to the primary credential associated with the physical card (block 440). For example, the management system 210 (e.g., using processor 320 and/or memory 330) may generate the virtual credential for the physical card in a format of the first issuing entity, as described above in connection with reference number 112 of FIG. 1C. As an example, the virtual credential may include a credential number (e.g., an account number), an expiration date for the credential number, and/or a security code associated with the credential number. In some implementations, the virtual credential is mapped to the primary credential associated with the physical card.

As further shown in FIG. 4, process 400 may include causing activation of the virtual credential in the credential manager (block 450). For example, the management system 210 (e.g., using processor 320 and/or memory 330) may cause activation of the virtual credential in the credential manager, as described above in connection with reference number 116 of FIG. 1C. As an example, activating the virtual credential in the credential manager may include generating a record indicating that the virtual credential is associated with the user's credential manager and/or is associated with the user.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel. The process 400 is an example of one process that may be performed by one or more devices described herein. These one or more devices may perform one or more other processes based on operations described herein, such as the operations described in connection with FIGS. 1A-1G. Moreover, while the process 400 has been described in relation to the devices and components of the preceding figures, the process 400 can be performed using alternative, additional, or fewer devices and/or components. Thus, the process 400 is not limited to being performed with the example devices, components, hardware, and software explicitly enumerated in the preceding figures.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The hardware and/or software code described herein for implementing aspects of the disclosure should not be construed as limiting the scope of the disclosure. Thus, the operation and behavior of the systems and/or methods are described herein without reference to specific software code—it being understood that software and hardware can be used to implement the systems and/or methods based on the description herein.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination and permutation of those items, including single members. As an example, "at least one of: a, b, or c" is intended to cover a, b, c, a-b, a-c, b-c, and a-b-c, as well as any combination with multiple of the same item. As used herein, the term "and/or" used to connect items in a list refers to any combination and any permutation of those items, including single members (e.g., an individual item in the list). As an example, "a, b, and/or c" is intended to cover a, b, c, a-b, a-c, b-c, and a-b-c.

When "a processor" or "one or more processors" (or another device or component, such as "a controller" or "one or more controllers") is described or claimed (within a single claim or across multiple claims) as performing multiple operations or being configured to perform multiple operations, this language is intended to broadly cover a variety of processor architectures and environments. For example, unless explicitly claimed otherwise (e.g., via the use of "first processor" and "second processor" or other language that differentiates processors in the claims), this language is intended to cover a single processor performing or being configured to perform all of the operations, a group of processors collectively performing or being configured to perform all of the operations, a first processor performing or being configured to perform a first operation and a second processor performing or being configured to perform a second operation, or any combination of processors performing or being configured to perform the operations. For example, when a claim has the form "one or more processors configured to: perform X; perform Y; and perform Z," that claim should be interpreted to mean "one or more processors configured to perform X; one or more (possibly different) processors configured to perform Y; and one or more (also possibly different) processors configured to perform Z."

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A system for inter-entity virtual credential generation, the system comprising:
   one or more memories; and
   one or more processors, communicatively coupled to the one or more memories, configured to:

receive, from a user device associated with a user, a first request to generate a virtual credential, wherein the virtual credential is to be activated in a credential manager, associated with the user, that is maintained by a first issuing entity;

transmit, to an interface system and responsive to the first request, a second request for credential information associated with the user;

receive, responsive to the second request, the credential information associated with the user, wherein the credential information indicates a primary credential associated with a physical card issued by a second issuing entity, and wherein the primary credential is in a format of the second issuing entity;

generate the virtual credential for the physical card in a format of the first issuing entity, wherein the virtual credential is mapped to the primary credential associated with the physical card; and transmit, to the user device in connection with activation of the virtual credential in the credential manager, information identifying the virtual credential.

2. The system of claim 1, wherein the one or more processors are further configured to:

cause a user interface associated with the interface system to be presented on the user device, wherein the user interface is configured to obtain a user input relating to sharing of the credential information; and receive an indication from the interface system that the user has authorized sharing of the credential information, wherein the second request is to be transmitted to the interface system after receiving the indication.

3. The system of claim 1, wherein the one or more processors are further configured to:

receive, from a transaction system, a first transaction request indicating the virtual credential;

resolve, responsive to the first transaction request, the virtual credential to the primary credential associated with the physical card; and transmit, to a processing system associated with the second issuing entity, a second transaction request indicating the primary credential associated with the physical card.

4. The system of claim 3, wherein the processing system lacks a capability to assign virtual credentials.

5. The system of claim 1, wherein the one or more processors are further configured to:

receive, from the user device, an indication of an additional user that is authorized to use the primary credential associated with the physical card; and generate an additional virtual credential for an additional credential manager, associated with the additional user, that is maintained by the first issuing entity, wherein the additional virtual credential is mapped to the primary credential associated with the physical card.

6. The system of claim 1, wherein the one or more processors are further configured to:

cause activation of the virtual credential in the credential manager.

7. The system of claim 1, wherein the credential manager stores the virtual credential and an additional virtual credential for an additional physical card issued by the first issuing entity.

8. The system of claim 1, wherein the credential manager is implemented in a browser extension of a web browser of the user device.

9. A method of inter-entity virtual credential generation, comprising:

receiving, by a device and from a user device associated with a user, a first request to generate a virtual credential, wherein the virtual credential is to be activated in a credential manager, associated with the user, that is maintained by a first issuing entity;

transmitting, by the device to an interface system and responsive to the first request, a second request for credential information associated with the user;

receiving, by the device and responsive to the second request, the credential information associated with the user, wherein the credential information indicates a primary credential associated with a physical card issued by a second issuing entity, and wherein the primary credential is in a format of the second issuing entity;

generating, by the device, the virtual credential for the physical card in a format of the first issuing entity, wherein the virtual credential is mapped to the primary credential associated with the physical card; and causing, by the device, activation of the virtual credential in the credential manager.

10. The method of claim 9, further comprising:

causing a user interface associated with the interface system to be presented on the user device, wherein the user interface is configured to obtain a user input relating to sharing of the credential information; and receiving an indication from the interface system that the user has authorized sharing of the credential information, wherein the second request is transmitted to the interface system after receiving the indication.

11. The method of claim 9, further comprising:

receiving, from a transaction system, a first transaction request indicating the virtual credential;

resolving, responsive to the first transaction request, the virtual credential to the primary credential associated with the physical card; and transmitting, to a processing system associated with the second issuing entity, a second transaction request indicating the primary credential associated with the physical card.

12. The method of claim 9, further comprising:

receiving, from the user device, an indication of a transaction category for the virtual credential; and storing information associating the virtual credential with the transaction category.

13. The method of claim 9, wherein the credential manager stores the virtual credential and an additional virtual credential for an additional physical card issued by the first issuing entity.

14. The method of claim 9, wherein the virtual credential and the primary credential are numeric.

15. A non-transitory computer-readable medium storing a set of instructions, the set of instructions comprising:

one or more instructions that, when executed by one or more processors of a device, cause the device to:

receive, from a user device, a first request to generate a virtual credential, wherein the virtual credential is to be activated in a credential manager, associated with a user, that is maintained by a first issuing entity;

transmit, to an interface system and responsive to the first request, a second request for credential information associated with the user;

receive, responsive to the second request, the credential information associated with the user, wherein the credential information indicates a primary credential associated with a physical card issued by a second issuing entity, and wherein the primary credential is in a format of the second issuing entity;

generate the virtual credential for the physical card in a format of the first issuing entity, wherein the virtual credential is mapped to the primary credential associated with the physical card; and cause activation of the virtual credential in the credential manager.

16. The non-transitory computer-readable medium of claim 15, wherein the one or more instructions, when executed by the one or more processors, further cause the device to:

cause a user interface associated with the interface system to be presented on the user device associated with the user, wherein the user interface is configured to obtain a user input relating to sharing of the credential information; and receive an indication from the interface system that the user has authorized sharing of the credential information, wherein the second request is to be transmitted to the interface system after receiving the indication.

17. The non-transitory computer-readable medium of claim 15, wherein the one or more instructions, when executed by the one or more processors, further cause the device to:

receive, from a transaction system, a first transaction request indicating the virtual credential;

resolve, responsive to the first transaction request, the virtual credential to the primary credential associated with the physical card; and transmit, to a processing system, a second transaction request indicating the primary credential associated with the physical card.

18. The non-transitory computer-readable medium of claim 15, wherein the one or more instructions, when executed by the one or more processors, further cause the device to:

store mapping information indicating that the virtual credential is mapped to the primary credential associated with the physical card.

19. The non-transitory computer-readable medium of claim 15, wherein the physical card is issued by the second issuing entity.

20. The non-transitory computer-readable medium of claim 15, wherein the virtual credential and the primary credential are numeric.

* * * * *